United States Patent [19]

Baermann

[11] E Re. 29,451

[45] Reissued Oct. 18, 1977

[54] LIGHT COLORED MAGNETIC RUBBER

[76] Inventor: Max Baermann, 506 Bensberg Bezirk, Cologne, Germany

[21] Appl. No.: 726,154

[22] Filed: Sept. 24, 1976

Related U.S. Patent Documents

Reissue of:

[64] Patent No.: 3,873,954
Issued: Mar. 25, 1975
Appl. No.: 494,631
Filed: Aug. 5, 1974

[30] Foreign Application Priority Data

Mar. 7, 1974 Germany ..... 2410902

[51] Int. Cl.[2] ..... H01F 7/02
[52] U.S. Cl. ..... 335/303; 335/302
[58] Field of Search ..... 335/302, 303, 306; 49/428

[56] References Cited

U.S. PATENT DOCUMENTS

| | | | |
|---|---|---|---|
| 3,124,725 | 3/1964 | Leguillon | 335/303 |
| 3,191,106 | 6/1965 | Baermann | 335/303 X |
| 3,406,363 | 10/1968 | Tate | 335/303 X |

*Primary Examiner*—George Harris
*Attorney, Agent, or Firm*—Meyer, Tilberry & Body

[57] ABSTRACT

A rubber-like flexible permanent magnet comprised of a mixture of granular, high coercivity, permanent magnet material and a rubber-like flexible binder material. A substantial e.g. 90 percent amount of the permanent magnetic material have a grain size of from 0.125 to 0.3 mm. More magnetic material may be used with the same flexibility. Light colored powders such as titanium oxide, or aluminum can be added or the grains coated with a metallic layer using vacuum deposition or a chemical bath deposition to make the final magnet light in color.

12 Claims, No Drawings

LIGHT COLORED MAGNETIC RUBBER

Matter enclosed in heavy brackets [ ] appears in the original patent but forms no part of this reissue specification; matter printed in italics indicates the additions made by reissue.

This invention relates to the art of permanent magnets and more particularly to a light colored, rubber-like flexible permanent magnet.

Rubber-like, flexible permanent magnets consisting of a rubber-like flexible binder material with particles of permanent magnetic materials of high coercivity such as barium-, strontium- or lead ferrite, finely dispersed throughout, are already known. They are used for a great variety of locking, sealing and holding applications. Manufactured in the form of profiles and strips, they are particularly useful for refrigerator gaskets. They also find widespread acceptance when produced in the form of plates or sheets and can be used for demonstration purposes by holding magnetically attracted material or articles on the surface.

These permanent magnetic materials which are embedded in the rubber-like flexible binder material have a characteristic, intensive dark, black/brown color which is imparted to the magnet which dark color is objectionable from an esthetic standpoint since it impairs the attractive appearance where the magnet would be visible.

In particular this is the case if flexible permanent magnets of that type are used as locking and sealing elements for refrigerators which are usually painted white for sanitary and esthetic reasons.

In the past, in order to avoid this disadvantage, the dark colored permanent magnet strip was enclosed in a casing of a nonmagnetic, flexible, light colored PVC-sealing strip which was in turn fastened onto the door of a refrigerator (U.S. Pat. No. 2,958,912). Apart from the fact that the formation of such a refrigerator closure required the provision of an additional non-magnetic sealing strip that had to be welded at the corners, the closing force of the refrigerator closure was in addition reduced to a considerable extent, since the non-magnetic upper surface of the casing was interposed between the holding face of the permanent magnet and the part of the refrigerator frame made of a ferro-magnetic material to which the permanent magnet strip adheres. The non-magnetic upper surface of the casing interposed between the frame and the magnet exercised the same effect as an air gap.

Attempts have been made in the past to provide the rubber-like flexible permanent magnet with a lighter color, either by adding coloring materials such as titanium oxide, or metal powders such as aluminum powder to the permanent magnet materials before combining with the binder material (U.S. Pat. No. 3,191,106). In doing so it was found out that for achieving a lighter color, such a high ratio of coloring material to magnet material had to be used that not only the flexibility but the magnetic values and particularly the remanence of the magnet material which already had a low remanence, were reduced appreciably.

The reduction in the magnetic attractive force was a result of the requirement that, if the same flexibility had to be achieved, part of the magnetic material had to be reduced and be replaced by a relatively high proportion of coloring material. If, on the other hand, the amount of magnetic material remained the same, part of the binder had to be replaced by the coloring material and the permanent magnet lost its flexibility, i.e., it became relatively brittle and rigid.

Other types of coloring materials having quite strong coloring characteristics did not show any better results. For this reason rubber-like, flexible permanent magnet material that was light colored in this way has not been practicable.

The present invention provides a rubber-like flexible permanent magnet having a light color, and having embedded therein the smallest possible proportion of coloring material without the magnetic attractive force and the flexibility being adversely affected by the coloring material.

In accordance with the invention a light colored, rubber-like flexible permanent magnet is provided which comprises a rubber-like flexible binder having dispersed therein a permanent magnetic material of high coercivity, such as barium-, strontium-, or lead ferrite powder, and a light coloring material, e.g., a light colored metallic powder. The permanent magnet material normally consists of relatively coarse grains having a grain size of 0.06 – 0.35 mm, the proportion of grain sizes being mainly within the range of 0.1 – 0.3 mm, and the proportion of fine and finest permanent magnet powder particles, with respect to the grain size, being removed or minimized to a negligibly small amount.

In accordance with the invention it was found out that it is essential to use a permanent magnetic powder which is composed of coarser grains, whereas up to now only fine and finest powders had been used. For the same volume of magnet material, the sum of the surface areas of the fine and finest grains are considerably larger than the sum of the surface areas of the coarse grains. In order to obtain a satisfactory light color of the rubber-like, flexible permanent magnet, a proportion by weight of up to 25 percent of the coloring metal powder was required for the coating of the relative large surface areas of the fine grains. These high proportions of non-magnetic coloring material reduced the magnetic attractive force to a considerable extent since with the same proportion of binder the proportion of magnet material had to be reduced by that percentage.

In accordance with the present invention, however, a good light coloring effect is obtained by using a mixture of permanent magnet powder with the coarser grains and a very small proportion of light coloring material. This result is due to the fact that a smaller surface area of coarse-grained permanent magnet material has to be coated.

However, some further knowledge is still necessary in order to obtain a rubber-like flexible permanent magnet offering a good attractive force, flexibility, and coloring effect. This knowledge consists in the possibility of replacing part of the rubber-like flexible binder material by the coloring material without adversely affecting the flexibility. This can be explained by the fact that the specific surface area of coarse grains is smaller than that of small grains. The same proportion of binder that is available therefore covers the coarser grains with a thicker layer since a smaller surface area has to be coated. Contrary thereto the finer grains are coated by a thinner layer. A permanent magnet having coarser grains therefore offers a better flexibility than a permanent magnet with a smaller grain size. Due to this knowledge it is possible to use a smaller amount of binder and instead either more coloring material and/or magnet material.

Thus, a flexible, light colored permanent magnet is obtained which, compared with the known flexible permanent magnets, not only offers the same flexibility, but also has a good light coloring effect and, in addition, a same or even better magnetic attractive force, although having a smaller proportion of binder provided therein.

In order to improve the characteristics of the light colored, flexible magnet furthermore, it is advantageous to compose the overall grain size range specified according to the invention, of different percentages of approximately equal grain sizes. For this purpose, e.g., the following percental grain size distribution of permanent magnet material has proved to be advantageous:

| | |
|---|---|
| Less than 5% by volume | 0.1 mm and smaller |
| approx. 30–50% by volume | 0.1 mm - 0.2 mm |
| approx. 30–50% by volume | 0.2 mm - 0.3 mm |
| approx. 5–10% by volume | 0.3 mm - 0.35 mm |

Within the specified grain size ranges, the composition may vary, since depending on the process for manufacturing the permanent magnet material and crushing of same, the grain shape of the powder will be different, i.e., there are more or less proportions of globoid, but also of cubic or small plate-shaped grains.

In accordance with the desired ultimate light color and the desired magnetic attractive force, coloring is preferably effected by mixing 2–15 percent by volume of light colored metal powder, as e.g., aluminum powder, into the mixture of binder and permanent magnet material having a grain size range as above specified according to the invention. The size of the metal powder should be as small as can be obtained commercially, the smaller the size, the greater the light coloring effect. This powder effectively coats the permanent magnet grains during the mixing process. Titanium dioxide or other light colored oxides can be used again in powder form of the smallest possible particle size.

The shape of the particles making up the powder may be that which is commercially available or can be made by ordinary grinding or milling techniques e.g. round, cubic, plate shaped or otherwise. The important thing is that the powder is able to fill in the voids between the permanent magnetic material and/or to coat the magnetic particles either in part or totally.

In a further preferred embodiment of the invention the permanent magnet powder particles may be provided, by means of a chemical process, with a colored coating in order to obtain a light colored, rubber-like, flexible permanent magnet material. Coating is effected according to the known dip tank method in an activated bath in which metal salts, as for instance salts of nickel, cadmium, copper and the like are dissolved.

In another preferred embodiment of the invention a light colored, flexible permanent magnet may be obtained by coating the permanent magnet powder particles, preferably with aluminum in the finest possible distribution, e.g., a vapor. This coating is effected by vapor plating in a vacuum.

An embodiment of the invention is described in the following:

In a preferred embodiment, the composition of the mixture of the colored, rubber-like flexible permanent magnet according to the invention comprises 3,377 g of barium ferrite powder. This total amount is composed of:

| | | |
|---|---|---|
| 168.5g. | with grain sizes ranging from | 0.063–0.125 = 5% by vol. |
| 1,520.0g. | " | 0.125–0.2 mm = 45% by vol. |
| 1,520.0g. | " | 0.2–0.3 mm = 45% by vol. |
| 168.5g. | " | 0.3–0.355 mm = 5% by vol. |

To this total amount of barium ferrite powder is added 105.4 g of aluminum powder. Referred to the total volume of permanent magnet material, this figure represents a proportion of aluminum powder of 5.67 percent by volume.

The rubber-like flexible binder is composed of 425 g of a soft synthetic rubber, as e.g., sulfochlorinated, plasticized polyethylene. The softener used for this purpose may be Vistanex L 140 produced by ENJAY Chemical Co.

The manufacture of the colored, rubber-like flexible permanent magnet according to the invention requires an intimate mixture of the permanent magnet-aluminum-powder with the rubber-like flexible binder in order to manufacture a granulate and process same on an extruder or calender, and finally it is necessary to magnetize the molded product in the form of profiles, strips, or sheets by means of a condenser discharge device.

In order to determine the percental composition by volume of the flexible permanent magnet, the proportions by weight are converted as follows:

| | | |
|---|---|---|
| 3,377. | g of permanent magnet material | = 86.47% in weight |
| 423. | g of binder | = 10.83% in weight |
| 105.4 | g of aluminum powder | = 2.7% in weight |
| 3,905.4 | g = total weight | |

Referred to the volume, the result is:

| | |
|---|---|
| 649.42 $cm^3$ of permanent magnet material | = 58.43% by vol. |
| 423.00 $cm^3$ of binder | = 38.06% by vol. |
| 39.04 $cm^3$ of aluminum powder | = 3.51% by vol |
| 1,111.46 $cm^3$=total volume | |

The rubber-like flexible permanent magnet according to the preferred embodiment is composed of 58.43 percent by vol. of permanent magnet material i.e., 86.47 percent in weight, 38.06 percent by vol. of binder, i.e., 10.83 percent in weight, and 3.51 percent by vol. of aluminum powder, i.e., 2.7 percent in weight.

In this specification, by "light" is meant any color lighter than the inherent dark brown of the various magnetic ferrites.

By virtue of the invention, it is no longer necessary to use a non-magnetic light colored cover for the permanent magnet indoor gaskets, thereby resulting in a higher magnetic closing force for the same size magnet and a substantial reduction in the cost of manufacture for such gaskets.

Having thus described my invention, I claim:

1. A light colored, rubber-like flexible permanent magnet comprised of a mixture of a rubber-like flexible binder, a permanent magnet material of high coercivity, as e.g., barium-, strontium-, or lead ferrite powder, and a material capable of giving the magnet a light color said permanent magnet material consisting essentially of relatively coarse grains having a grain size of 0.06 - 0.35 mm, the grain size mainly ranging from 0.1 - 0.3 mm, and the proportion of fine and finest permanent magnet powder particles, with respect to the grain size, being minimized to a negligibly small amount.

2. The permanent magnet according to claim 1 wherein the total volume of powdered permanent magnet material is composed of a proportion of less than 5 percent by volume of grains having a grain size of 0.1 mm and less, 30–50 percent by volume of grains having a grain size of 0.1 - 0.2 mm, 30–50 percent by vol. of grains having a grain size of 0.2 - 0.3 mm, and 5–10 percent by vol. of grains having a gain size of 0.3 - 0.35 mm.

3. The permanent magnet according to claim 1 wherein the light colored material comprises 2–15 percent by vol. of finely divided metal powder, as e.g., aluminum powder.

4. The permanent magnet according to claim 2 wherein the light colored material comprises 2–15 percent by vol. of finely divided metal powder, as e.g., aluminum powder.

5. The permanent magnet according to claim 1 wherein the permanent magnet particles are provided with a colored coating, as e.g., of nickel, cadmium, copper, said coating being effected by a chemical process.

6. The permanent magnet according to claim 1 wherein the permanent magnet powder particles are coated with aluminum by means of vapor plating in a vacuum.

7. The permanent magnet according to claim 2 wherein the permanent magnet particles are provided with a colored coating, as e.g., of nickel, cadmium, copper, said coating being effected by a chemical process.

8. The permanent magnet according to claim 2 wherein the permanent magnet powder particles are coated with aluminum by means of vapor plating in a vacuum.

9. The permanent magnet according to claim 1 wherein the proportion of fine and finest permanent magnet powder particles, with respect to the grain size, is removed.

*10. A rubber-like flexible permanent magnet comprised of a mixture of a rubber-like flexible binder and a permanent magnet material of high coercitivity, as e.g., barium-, strontium-, of lead ferrite powder, said permanent magnet material consisting essentially of relatively coarse grains having a grain size of 0.06–0.35 mm, the grain size mainly ranging from 0.1–0.3 mm, and the proportion of fine and finest permanent magnet powder particles, with respect to grain size being minimized to a negligibly small amount.*

*11. The permanent magnet according to claim 10 wherein the total volume of powdered magnet material is composed of a proportion of less than 5 percent by volume of grains having a grain size of 0.1 mm and less, 30–50 percent by volume of grains having a grain size of 0.1–0.2 mm, 30–50 percent by volume of grains having a grain size of 0.2–0.3 mm, and 5–10 percent by volume of grains having a grain size of 0.3–0.35 mm.*

*12. The permanent magnet according to claim 10 wherein the proportion of fine and finest permanent magnet powder particles, with respect to grain size, is removed.*

* * * * *